US011167843B1

(12) United States Patent
Kim (10) Patent No.: US 11,167,843 B1
(45) Date of Patent: Nov. 9, 2021

(54) DRONE WITH SUB-ROTORS

(71) Applicant: In Heon Kim, Seoul (KR)

(72) Inventor: In Heon Kim, Seoul (KR)

( * ) Notice: Subject to any disclaimer, the term of this patent is extended or adjusted under 35 U.S.C. 154(b) by 0 days.

(21) Appl. No.: 17/221,058

(22) Filed: Apr. 2, 2021

(30) Foreign Application Priority Data

Jul. 13, 2020 (KR) ........................ 10-2020-0085997

(51) Int. Cl.
*B64C 27/08* (2006.01)
*B64C 39/02* (2006.01)
*B64D 45/00* (2006.01)

(52) U.S. Cl.
CPC ............ *B64C 27/08* (2013.01); *B64C 39/024* (2013.01); *B64C 2201/027* (2013.01); *B64C 2201/108* (2013.01); *B64C 2201/141* (2013.01); *B64C 2201/162* (2013.01); *B64D 2045/0085* (2013.01)

(58) Field of Classification Search
CPC . B64C 27/08; B64C 39/024; B64C 2201/162; B64C 2201/027; B64C 2201/141; B64C 2201/108; B64D 2045/0085
See application file for complete search history.

(56) References Cited

U.S. PATENT DOCUMENTS

| | | | | |
|---|---|---|---|---|
| 5,597,138 A | * | 1/1997 | Arlton | A63H 27/12 244/17.13 |
| 5,609,312 A | * | 3/1997 | Arlton | A63H 27/12 244/108 |
| 5,628,620 A | * | 5/1997 | Arlton | A63H 27/12 416/103 |
| 5,749,540 A | * | 5/1998 | Arlton | B64C 27/82 244/17.13 |
| 6,142,419 A | * | 11/2000 | Arlton | A63H 27/12 244/100 R |
| 6,409,030 B1 | * | 6/2002 | Schlemper | D05C 15/20 112/80.45 |

(Continued)

FOREIGN PATENT DOCUMENTS

| CN | 110127041 A | * | 8/2019 | .......... G05D 1/0858 |
|---|---|---|---|---|
| JP | 2017056934 A | * | 3/2017 | .......... B64C 39/024 |

(Continued)

*Primary Examiner* — Behrang Badii
*Assistant Examiner* — Jalal C Coduroglu
(74) *Attorney, Agent, or Firm* — KORUS Patent, LLC; Seong Il Jeong (57) ABSTRACT

The present invention provides a drone comprising: a drone body; main rotors generating a driving force; sub-rotors generating a driving force instead of the main rotor above and below the main rotor, respectively; connection frames connecting the sub-rotors to the drone body above and below the main rotor, respectively; a detector detecting failure of the main rotors; and a controller controlling the sub-rotors to generate a driving force when detecting failure of the main rotor, wherein the connection frame is rotatably connected to the drone body, rotates, and moves the sub-rotor; wherein each connection frame comprises a rotation frame protruded upward or downward from the drone body and rotatably connected to the drone body; a horizontal frame horizontally connecting the sub-rotor to the rotation frame, and a balance weight protruded from the rotation frame in an opposite direction to the horizontal frame.

3 Claims, 5 Drawing Sheets

(56) References Cited

U.S. PATENT DOCUMENTS

| | | | | |
|---|---|---|---|---|
| 6,487,607 | B1* | 11/2002 | Wollrath | G06F 9/547 |
| | | | | 719/330 |
| 2007/0034734 | A1* | 2/2007 | Yoeli | B64C 27/20 |
| | | | | 244/12.1 |
| 2009/0253414 | A1* | 10/2009 | Gosselin | H04M 15/8094 |
| | | | | 455/414.1 |
| 2011/0052392 | A1* | 3/2011 | Khmel | B64C 39/024 |
| | | | | 416/1 |
| 2014/0046881 | A1* | 2/2014 | Losl | G05B 23/0245 |
| | | | | 706/14 |
| 2019/0256191 | A1* | 8/2019 | Suzuki | B64C 27/08 |
| 2019/0276140 | A1* | 9/2019 | Poltorak | B64C 27/08 |

FOREIGN PATENT DOCUMENTS

| | | | | |
|---|---|---|---|---|
| JP | 6409030 B2 | 10/2018 | | |
| JP | 6487607 B2 | 3/2019 | | |
| JP | 2020082908 A * | 6/2020 | | |
| KR | 10-2017-0027096 A | 3/2017 | | |
| KR | 10-2054119 B1 | 12/2019 | | |
| KR | 10-2057663 B1 | 12/2019 | | |
| KR | 10-2101636 B1 | 4/2020 | | |
| WO | 2016/089882 A1 | 6/2016 | | |
| WO | WO-2018071592 A2 * | 4/2018 | | B64C 27/08 |
| WO | WO-2018084261 A * | 5/2018 | | B64D 27/02 |
| WO | WO-2018090790 A1 * | 5/2018 | | B64C 27/14 |
| WO | WO-2019065848 A1 * | 4/2019 | | B64C 39/024 |

\* cited by examiner

DRONE WITH SUB-ROTORS

FIELD OF THE INVENTION

The present invention relates to a drone with sub-rotors and more particularly, to a drone with sub-rotors that enables a stable flight and prevents a crash by generating a flight driving force instead of a main rotor when one or portion of main rotors breaks down.

BACKGROUND OF THE INVENTION

A drone is a type of aerial vehicles which takes off and lands anywhere, anytime. Since a drone is easily controlled, inexpensive, and lightweight, it is widely used in various areas such as broadcast, monitoring emergencies and disasters, logistics distribution, and forest fire extinguishment.

In general, a drone is a multi-rotor type aerial vehicle having multiple rotors, which is more stable and safer than a helicopter having a single rotor. In addition, the drone is less noisy during the use since it is driven by a motor, not by an engine.

However, the drone is likely to have a broken rotor because it uses a plurality of rotors. Even if only one of rotors breaks down, it may lead to be lack of a flight driving force or cause imbalance of a flight driving force of the drone, which may be a cause of a crash. Furthermore, even if the drone does not crash, other normal rotors have to generate an additional driving force or an excessive driving force to have the drone balanced, which causes other rotors overheating and deterioration, and shortens life cycle of the drone.

Prior art document is Korean Registration Patent No. 10-2101636.

Technical Problem

The present invention is devised to solve the problems mentioned above. One object of the invention is to provide a drone with sub-rotors that enables a stable flight and prevents a crash by generating a flight driving force instead of a main rotor when one or portion of main rotors breaks down.

Another object of the invention is to provide a drone with sub-rotors that enables the drone to have balance during the flight when one or portion of main rotors breaks down, by generating a flight driving force above or below the broken main rotor.

Another object of the invention is to provide a drone with sub-rotors that is configured to prevent weight imbalance of the drone, which is caused when any one sub-rotor is moved to replace a function of the broken main rotor, and a distribution of multiple sub-rotors asymmetrically leans to one side.

SUMMARY OF THE INVENTION

The present invention provides a hair dyeing apparatus comprising a drone body; a plurality of main rotors generating a flight driving force to enable the drone body to fly; a first sub-rotor generating a flight driving force instead of the main rotor at a position above the main rotor; a second sub-rotor generating a flight driving force instead of the main rotor at a position below the main rotor; a first connection frame supportedly connecting the first sub-rotor to the drone body so that the first sub-rotor is located above the main rotor; a second connection frame supportedly connecting the second sub-rotor to the drone body so that the second sub-rotor is located below the main rotor, a failure detector detecting failure of the main rotors; and a controller controlling the first or the second sub-rotor to generate a flight driving force instead of the main rotor when receiving a failure signal of the main rotor from the failure detector.

In this instance, sub-rotors may generate a flight driving force instead of the main rotor at a position above or below the main rotor.

In addition, the drone may further comprise more than one connection frame supportedly connecting each of the sub-rotors to the drone body at levels different from that of the main rotor. The connection frame is rotatably connected to the drone body, rotates by rotation driving control of the controller, and moves a position of the sub-rotor.

Furthermore, when the sub-rotors and the connection frames are plural, the rotation areas of the connection frames may not overlap with one another.

Moreover, the controller may comprise a selector receiving a failure signal of a broken main rotor of the main rotors and selecting one of the first sub-rotor and the second sub-rotor, that is disposed closer to the broken main rotor than the other; a rotation angle calculator calculating a rotation angle of the first or the second connection frame in order to place a selected sub-rotor of the first or the second connection at a position above or below the broken main rotor; a rotation driver rotating the first or the second connection frame according to a calculated rotation angle, and a sub-rotor driver driving the selected sub-rotor to generate a flight driving force.

In addition, when one of the sub-rotors is located at a first position above or below the broken main rotor, the controller may control the connection frame so that the other of the sub-rotors is located at an opposite position to the first position with regard to a center of the drone body.

Furthermore, the failure detector may comprise a rotation speed detector detecting a rotation speed of a propeller of each of the main rotors, and a failure determinator determining failure of the main rotors in case that a detected propeller rotation speed of any one of the main rotors is out of a normal range of rotation speed.

Technical Effects of the Invention

According to the present invention, when one or portion of main rotors breaks down, the drone can continue the flight and prevent a crash by sub-rotors generating a flight driving force instead of the broken main rotor.

In addition, when one or portion of main rotors breaks down, the drone can form a balanced driving force by a sub-rotor disposed at a position above or below the broken main rotor.

Furthermore, when one of the sub-rotors is disposed at a first position above or below the broken main rotor, the other of the sub-rotors is disposed in an opposite position to the first position with respect to a center of a drone body, which prevents weight imbalance of the drone.

DETAILED DESCRIPTION EMBODIMENTS OF THE INVENTIONS

Hereafter, the present invention will be described in more detail with reference to accompanying drawings, in which preferred embodiments are shown. In the use of reference numerals in the various drawings, identical numbers are intended to indicate the presence of an identical element of feature. In addition, detailed explanation regarding related elements or functions, which are well known to one of ordinary skill in the art, are omitted in case it may cloud the gist of the present invention.

Figure 1:
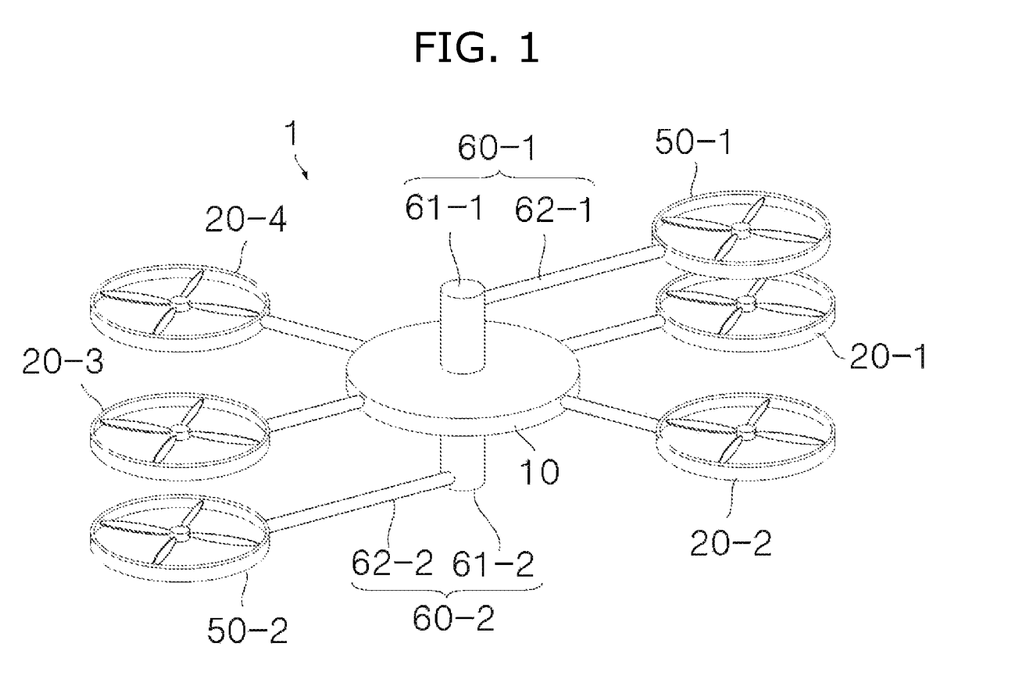
FIG. 1 is a drawing conceptually showing a drone with sub-rotors according to one embodiment of the present invention.
Figure 2:
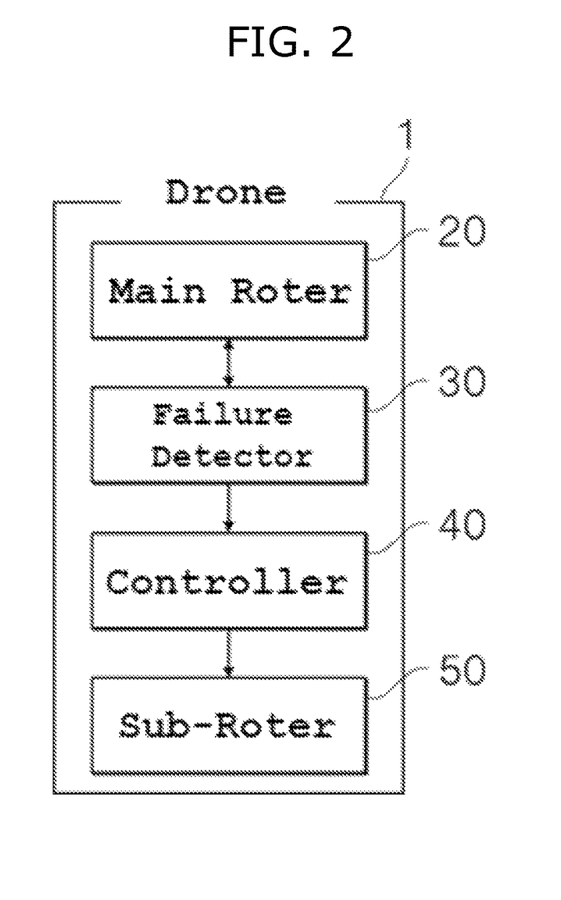
FIG. 2 is a block diagram regarding functional elements of the drone according to one embodiment of the present invention.
Figure 3:
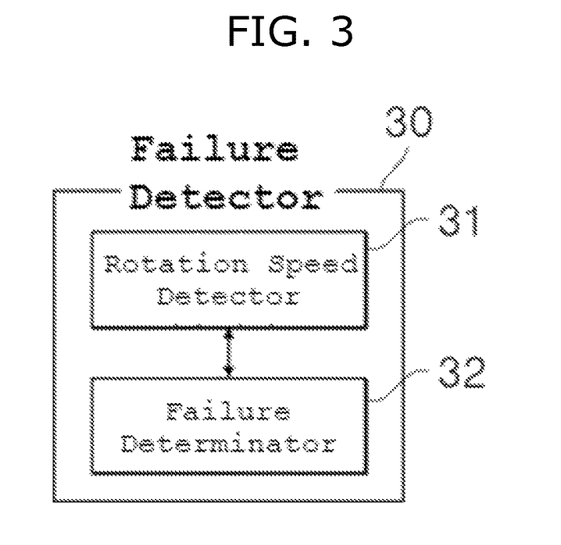
FIG. 3 is a block diagram regarding functional elements of a detector according to one embodiment of the present invention.
Figure 4:
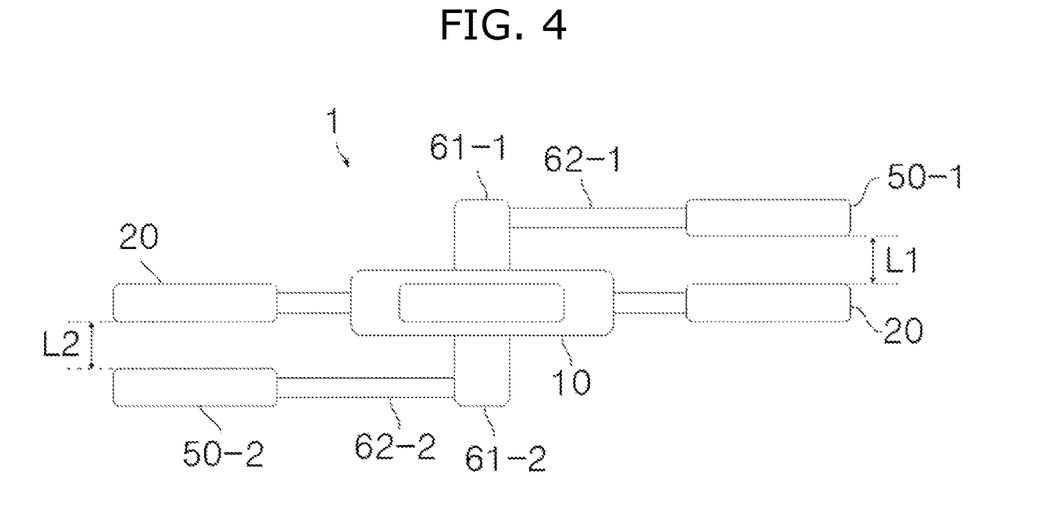
FIG. 4 is a drawing conceptually showing a side view of a drone according to one embodiment of the present invention.

FIG. 1 is a drawing conceptually showing a drone with sub-rotors according to one embodiment of the present invention. FIG. 2 is a block diagram regarding functional elements of the drone according to one embodiment of the present invention. FIG. 3 is a block diagram regarding functional elements of a detector according to one embodiment of the present invention. FIG. 4 is a drawing conceptually showing a side view of a drone according to one embodiment of the present invention.

A drone with sub-rotors (hereafter referred to as the "drone") according to one embodiment of the present invention, can continue flight and prevent a crash by a sub-rotor generating a flight driving force instead of a broken main rotor 20 when one or portion of main rotors 20 breaks down. In addition, when one or portion of main rotors 20 breaks down, the drone can form a balanced driving force by the sub-rotor disposed at a position above or below the broken main rotor.

To achieve this technical effects, the drone 1 according to one embodiment of the present invention may comprise a drone body 10, a main rotor 20, a failure detector 30, a controller 40, a sub-rotor 50, and a connection frame 60.

Referring to FIG. 1, a plurality of main rotors 20 are connected to the drone body 10 and generate a flight driving force to make the drone body 10 fly. In FIG. 1, there are a four axis drone having four main rotors 20-1, 20-2, 20-3, 20-4, is illustrated but the present invention is not limited to. The number of the main rotors 20 may be changed, as necessary. In the following description, a four axis drone having four main rotors will be explained as one example of the present invention for the sake of convenience in description.

Referring to FIG. 2, the failure detector 30 detects failure or breakdown of each of the main rotors 20, generates a failure signal if failure of the main rotors 20 is detected, and then transmits the failure signal to the controller 40.

Specifically, referring to FIG. 3, the failure detector 30 may comprise a rotation speed detector 31 and a failure determinator 32. In this instance, the rotation speed detector 31 is plural, and each is disposed in each of the main rotors 20. Respective rotation speed detector 31 detects a rotation speed of a propeller of each of the main rotors 20. In this instance, the rotation speed detector 31 may be embodied with a hall sensor but is not limited to. The rotation speed detector 31 may be embodied with any one of detection sensors.

The information of the rotation speed of the propeller, which is detected by the rotation detector 31, is transmitted to the failure determinator 32. The failure determinator 32 detects if the detected propeller rotation speed is within the normal range of rotation speed and determines the failure of the main rotors 20. When the failure determinator 32 detects one main rotor 20 of which the propeller rotation speed is out of the normal range, the failure determinator 32 determines that main rotor 20 as failure, generates the failure signal, and transmits it to the controller 40.

Referring to FIG. 3 again, when the controller 40 receives the failure signal from the failure determinator 32, the controller 40 controls the sub-rotor 50 to generate a flight driving force instead of a broken main rotor 20. Accordingly, the drone 1 in flight can continue the flight and prevent a crash with sub-rotors 50 generating an enough flight driving force even if one or portion of main rotors 20 breaks down.

In addition, the sub-rotor 50 is movably connected to the drone body 10 through the connection frame 60. The controller 40 controls the sub-rotor 50 to generate a flight driving force at a position above or below the broken main rotor 40, enabling the drone 1 to have a balanced driving force, when one or portion of main rotors 20 breaks down. The controller 40 will be described in more details later referring to FIGS. 5 to 7.

Referring to FIG. 1 again, the sub-rotor 50 may be configured to be identical to the main rotor 20. However, unlike the main rotor 20, the sub-rotor 50 does not essentially operated but operated as necessary. Specifically, the sub-rotor 50 may generate an additional flight driving force when high-speed flight is required, or an additional driving force is required to life up a heavy load. Desirably, the sub-rotor 50 generates a flight driving force instead of the broken main rotor 20 according to a driving control of the controller 40 when failure of the main rotor 20 is detected. The sub-rotor 50 may be plural but may be single, as necessary. In this embodiment, each of two sub-rotors 50 is disposed above and below the drone body 10, respectively.

The sub-rotor 50 is supportedly connected to the drone body 10 through the connection frame 60. Specifically, the sub-rotor 50 is connected to the connection frame 60 so that the sub-rotor 50 is located at a different level from that of the main rotor 20. The connection frame 60 is rotatably connected to the drone body 10, rotates according to rotation control of the controller 40, and moves the position of the sub-rotor 50. In this instance, the connection frame 60 may be plural, and the number of the connection frames 60 is corresponding to the number of the sub-rotor 50. Each of the connection frame 60 is individually controlled by the controller 40 and independently rotated.

More specifically, referring to FIG. 4, the connection frame 60 comprises a rotation frame 61 and a horizontal frame 62.

The rotation frame 61 is rotatably connected to a top side or a bottom side of the drone body 10 and is disposed to be protruded upward or downward from a center of the drone body 10. The rotation frame 61 is rotated according to rotation control of the controller 40. The horizontal frame 62 connects the sub-rotor 50 to the rotation frame 61 in a horizontal direction so that the sub-rotor 50 is moved according to the rotation of the rotation frame 61. In this instance, the horizontal frame 62 has a certain length so that the sub-rotor 50 is positioned right above or right below the main rotor 20. In addition, the horizontal frame 62 is connected to the rotation frame 61 at a position spaced apart from the drone body 10 so that the sub-rotor 50 is spaced apart from the main rotor 20 with a certain distance L1, L2 in an upward or a downward direction. With this configuration of the rotation frame 61, the position of the sub-rotor 50 is moved to a position right above or right below any one of the main rotors 20 according to the rotation of the rotation frame 61.

Figure 5:
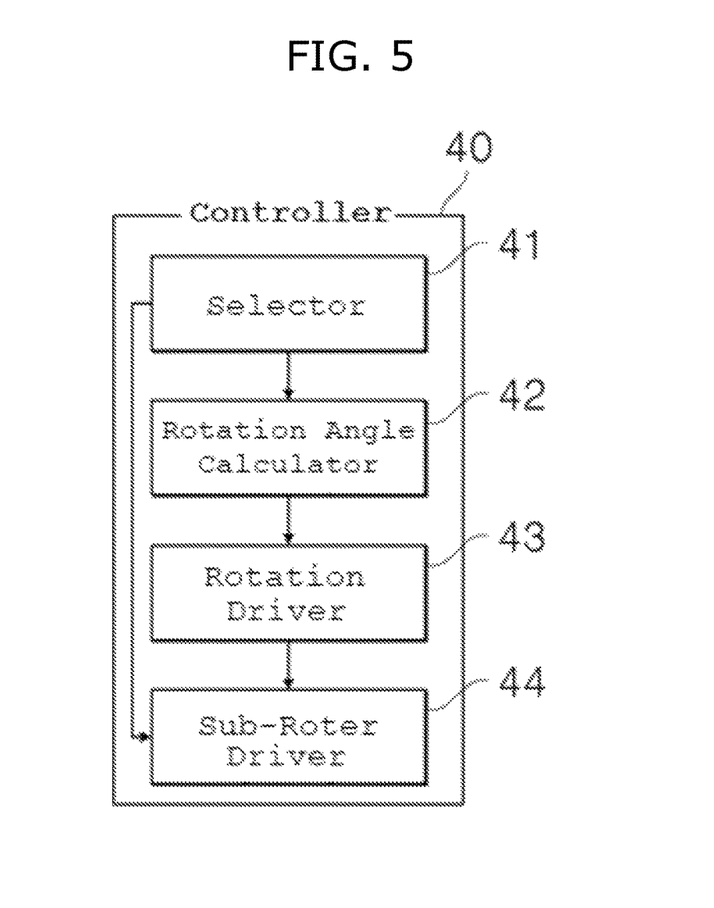
FIG. 5 is a block diagram regarding functional elements of a controller according to one embodiment of the present invention.
Figure 6A:
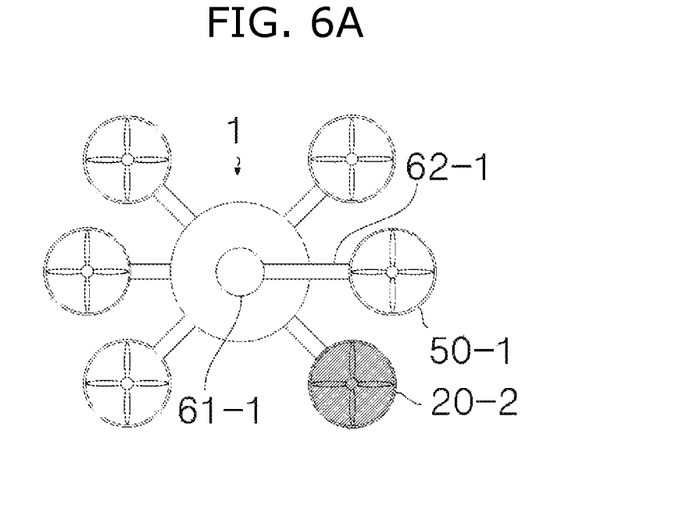
FIGS. 6A-6B and FIG. 7 are drawings showing a driving example of a sub-rotor and a connection frame according to one embodiment of the present invention.
Figure 6B:
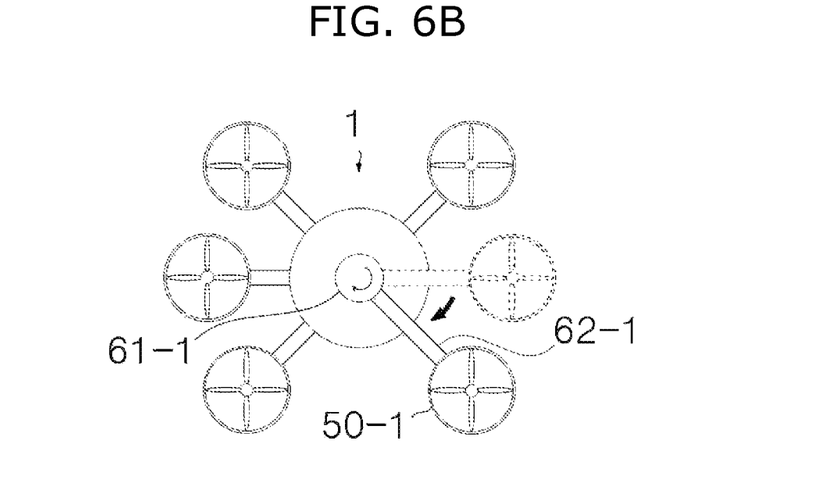
Figure 7:
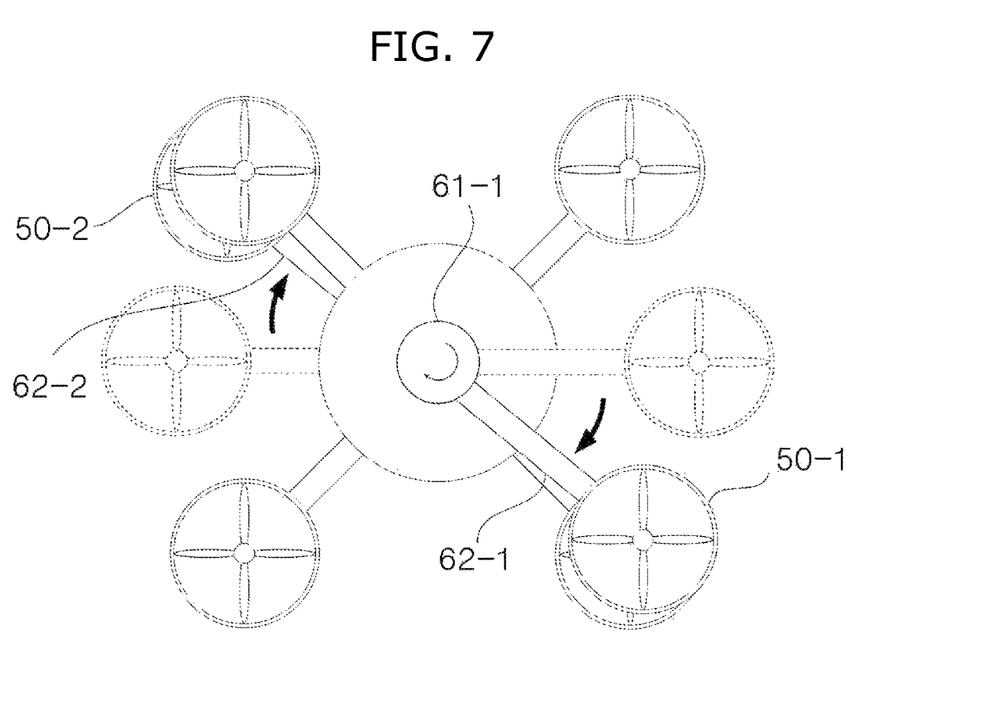

FIG. 5 is a block diagram regarding functional elements of a controller according to one embodiment of the present invention. FIGS. 6A-6B and FIG. 7 are drawings showing an example of a drive operation of a sub-rotor and a connection frame according to one embodiment of the present invention.

As described above, when the controller 40 receives the failure signal from the failure determinator 32, the controller 40 controls the sub-rotor 50 to generate a flight driving force instead of a broken main rotor 20. The controller 50 also controls the rotation of the connection frame 60 so that the sub-rotor 50 generates the flight driving force at a position above or below the broken main rotor 20.

Referring to FIG. 5, the controller 40 may comprise a selector 41, a rotation angle calculator 42, a rotation driver 43, and a sub-rotor driver 44.

When the selector 41 receives the failure signal of the main rotor 20 from the failure detector 30 and detects failure of the main rotor 20, the selector 41 can select a sub-rotor 40, which is closest to the broken main rotor 20, among the sub-rotors 40 on stand-by. Desirably, the selector 41 may determine a current location of the sub-rotor 50 based on a rotation angle from an initial location of the sub-rotor 50.

In this instance, in case that the drone 1 comprises a plurality of the sub-rotors 50 and the connection frames 60, a rotatable area of one connection frame 60 may not overlap with that of other connection frame 60, and each sub-rotor 50 may be assigned to at least one of main rotors 20 in order to substitute for the broken main rotors when the main rotor 20 breaks down. In this case, when the selector 41 detects failure of the main rotor 20, the selector 41 may select a sub-rotor 50 to replace the broken main rotor 20. In some embodiments, a drone 1 may comprise a single sub-rotor 50, and in this case, the selector 41 of the controller 40 may be omitted.

The rotation angle calculator 42 calculates a rotation angle of the connection frame 60 in order to place a selected sub-rotor 50 at a position above or below the broken main rotor 20. The rotation driver 43 places the selected sub-rotor 50 at a position above or below the broken main rotor 20 by rotating the connection frame 60 according to a calculated rotation angle. When the selected sub-rotor 50 is located at the position above or below the broken main rotor 20, the sub-rotor driver 44 drives the selected sub-rotor 50 to generate a flight driving force instead of the broken main rotor 20.

For example, referring to FIGS. 6A and 6B, when the selector 41 receives the failure signal of a second main rotor 20-2 from the failure detector 30, the selector 41 can select a sub-rotor 50-1, which is located in a relatively closer position to the second main rotor 20-2 than the other sub-rotor. Once the sub-rotor 50-1 is selected, the rotation angle calculator 42 calculates a rotation angle of the connection frame 60 in order to place the selected sub-rotor 50-1 at a position right above or right below the broken main rotor 20-2. Then, as shown in FIG. 6B, the rotation driver 43 places the selected sub-rotor 50-1 at the position right above or right below the broken main rotor 20-2 by rotating the connection frame 60 according to a calculated rotation angle. When the selected sub-rotor 50-1 is located at the position right above or right below the broken main rotor 20-1, the sub-rotor driver 44 drives the selected sub-rotor 50-1 to generate a flight driving force instead of the broken main rotor 20-1.

As described above, the controller 40 may control each of the connection frame 60 individually so that each of the sub-rotor 50 is independently placed at a respective position. Desirably, when one sub-rotor 50 is located at a first position right above or right below a broken main rotor 20, the controller 40 may control the other sub-rotor 50 to be located at a position opposite to the first position with respect to a center of the drone body 10.

Specifically, referring to FIG. 7, when one sub-rotor 50-1, which is located in a first position right above or right below a broken main rotor 20-2, generates a flight driving force instead of the broken main rotor 20-2, the selector 41 selects the other sub-rotor 50-2, or another sub-rotor. Then, the rotation angle calculator 42 calculates a rotation angle of a connection frame 60 in order to place a selected sub-rotor 50-2 at a second position opposite to the first position with respect to a center of the drone body 10. Once the rotation angle is calculated, the rotation driver places the other sub-rotor 50-2 at the second position by rotating the connection frame 60 according to the calculated rotation angle. In this instance, the sub-rotor 50-2 located at the second position is not driven. The sub-rotor 50-2 can prevent weight imbalance of the drone, which is caused when one sub-rotor 50-1 is moved to the first position and a distribution of multiple sub-rotors 50 asymmetrically leans to one side.

In case that a drone 1 comprises more than two sub-rotor 50, the controller 40 maintains separation distances between adjacent two sub-rotors 50 identical to one another, which enables the drone 1 to have balance at all times. More specifically, the controller 40 may maintain angles between adjacent two sub-rotors 50 identical to one another, thereby keeping balance of the drone 1 at all times. For example, in case that a drone 1 comprises three sub-rotors 50, the sub-rotors 50 are disposed to form 120° (2.094 rad) as an angle between adjacent two sub-rotors 50, thereby keeping the distances between adjacent two sub-rotors 50 identical to one another. In case that a drone 1 comprises four sub-rotors 50, the sub-rotors 50 are disposed to form 90° (1.571 rad) as an angle between adjacent two sub-rotors 50, thereby keeping the distances between adjacent two sub-rotors 50 identical to one another.

Figure 8:
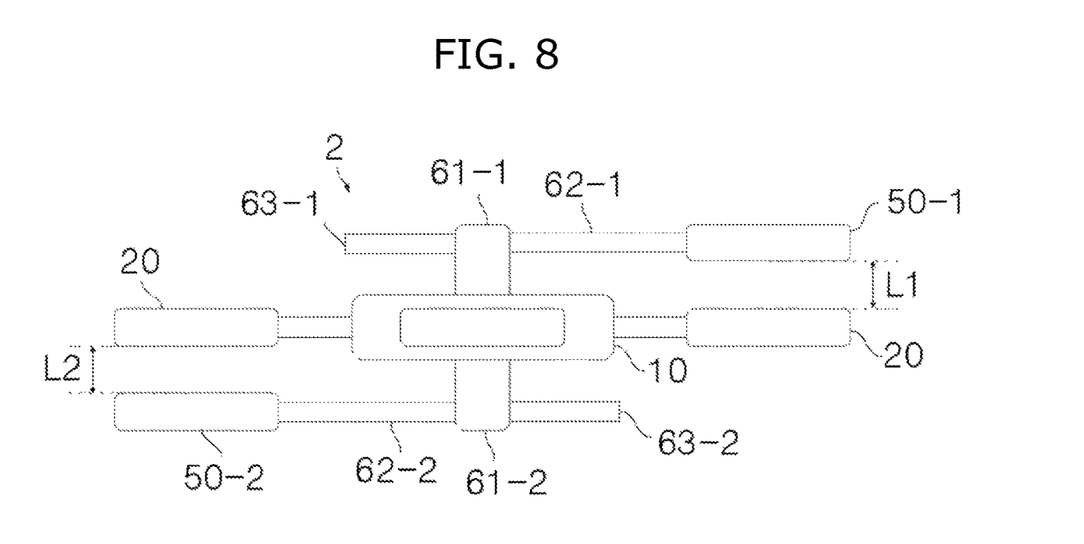
FIG. 8 is a drawing conceptually showing a side view of a drone according to one embodiment of the present invention.

In some embodiment, the connection frame 60 may further comprise a balance weight, which is protruded from the rotation frame 61 in an opposite direction to each of the horizontal frame 62 with respect to the rotation frame 61, thereby counterbalancing the weight of the horizontal frame 62 and the sub-rotor 20. Thus, the drone 1 can keep balance of the weight at all times without control by the controller 40 described above. Specifically, referring to FIG. 8 together, a first connection frame comprises a first rotation frame 61-1, a first horizontal frame 62-1, and a first balance weight 63-1. The first balance weight 63-1 is protruded from the first rotation frame 61-1 in an opposite direction to the first horizontal frame 62-1, thereby counterbalancing the weight of the first horizontal frame 62-1 and a first sub-rotor 50-1. Likewise, a second connection frame comprises a second rotation frame 61-2, a second horizontal frame 62-2, and a second balance weight 63-2. The second balance weight 63-2 is protruded from the second rotation frame 61-2 in an opposite direction to the second horizontal frame 62-2, thereby counterbalancing the weight of the second horizontal frame 62-2 and a second sub-rotor 50-1.

While embodiments of the present invention have been described, the present invention is not limited to what has been particularly shown. It would be apparent that many more modifications and variations than mentioned above are possible by an ordinary person skilled in the art. Accordingly, the embodiments disclosed above does not limit the inventive concept of the present invention but explain the invention; thus, the inventive concept of the present invention is not limited to these embodiments. The scope of the present invention includes scopes of appended claims, modifications, and variations.

What is claimed is:

1. A drone with sub-rotors, the drone comprising:
   a drone body;
   a plurality of main rotors generating a flight driving force to enable the drone body to fly;
   a first sub-rotor generating a flight driving force instead of one of the main rotors at a position above the main rotors;
   a second sub-rotor generating a flight driving force instead of one of the main rotors at a position below the main rotors;
   a first connection frame supportedly connecting the first sub-rotor to the drone body so that the first sub-rotor is located above the main rotors;
   a second connection frame supportedly connecting the second sub-rotor to the drone body so that the second sub-rotor is located below the main rotors,
   a failure detector detecting failure of the main rotors; and
   a controller controlling the first or the second sub-rotor to generate a flight driving force instead of one of the main rotors when receiving a failure signal of the one of the main rotors from the failure detector,
   wherein the first or the second connection frame is rotatably connected to the drone body, rotates according to rotation control of the controller, and moves a position of the first or the second sub-rotor circumferentially around the drone body;
   wherein the first connection frame comprises:
      a first rotation frame protruded upward from a top side of a center of the drone body and rotatably connected to the drone body;
      a first horizontal frame having a length so that the first sub-rotor is positioned above the main rotors and supportedly connecting the first sub-rotor to the first rotation frame in a horizontal direction, and
      a first balance weight protruded from the first rotation frame in an opposite direction to the first horizontal frame, thereby counterbalancing the weight of the first horizontal frame and the first sub-rotor;
   wherein the second connection frame comprises:
      a second rotation frame protruded downward from a bottom side of a center of the drone body and rotatably connected to the drone body;
      a second horizontal frame having a length so that the second sub-rotor is positioned below the main rotors and supportedly connecting the second sub-rotor to the second rotation frame in a horizontal direction, and
      a second balance weight protruded from the second rotation frame in an opposite direction to the second horizontal frame, thereby counterbalancing the weight of the second horizontal frame and the second sub-rotor.

2. The drone according to claim 1, wherein the controller comprises:
   a selector receiving a failure signal of a broken main rotor of the main rotors and selecting one of the first sub-rotor and the second sub-rotor, that is disposed closer to the broken main rotor than the other;
   a rotation angle calculator calculating a rotation angle of the first or the second connection frame in order to place a selected sub-rotor of the first or the second connection at a position above or below the broken main rotor;
   a rotation driver rotating the first or the second connection frame according to a calculated rotation angle, and
   a sub-rotor driver driving the selected sub-rotor to generate a flight driving force.

3. The drone according to claim 1, wherein the failure detector comprises:
   a rotation speed detector detecting a rotation speed of a propeller of each of the main rotors, and
   a failure determinator determining failure of the main rotors in case that a detected propeller rotation speed of any one of the main rotors is out of a normal range of rotation speed.

* * * * *